Feb. 8, 1938.                G. B. MOROSS                 2,107,422
         AUTOMATIC CHANGE SPEED GEARING FOR AUTOMOTIVE VEHICLES
                    Filed Jan. 26, 1933          3 Sheets-Sheet 1
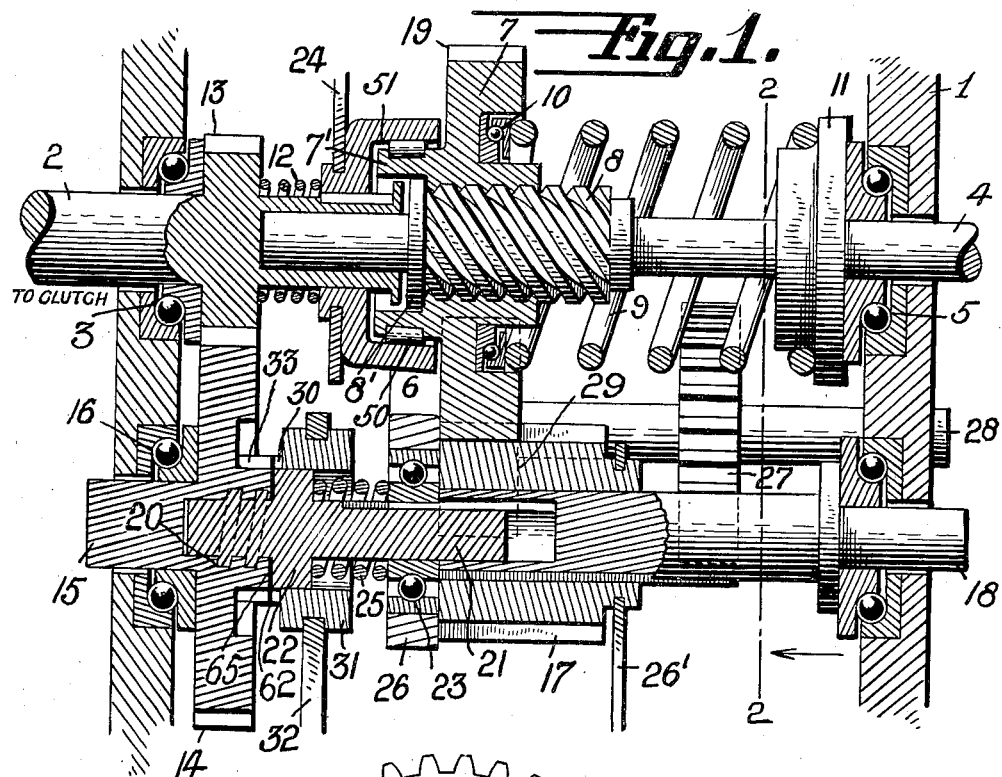
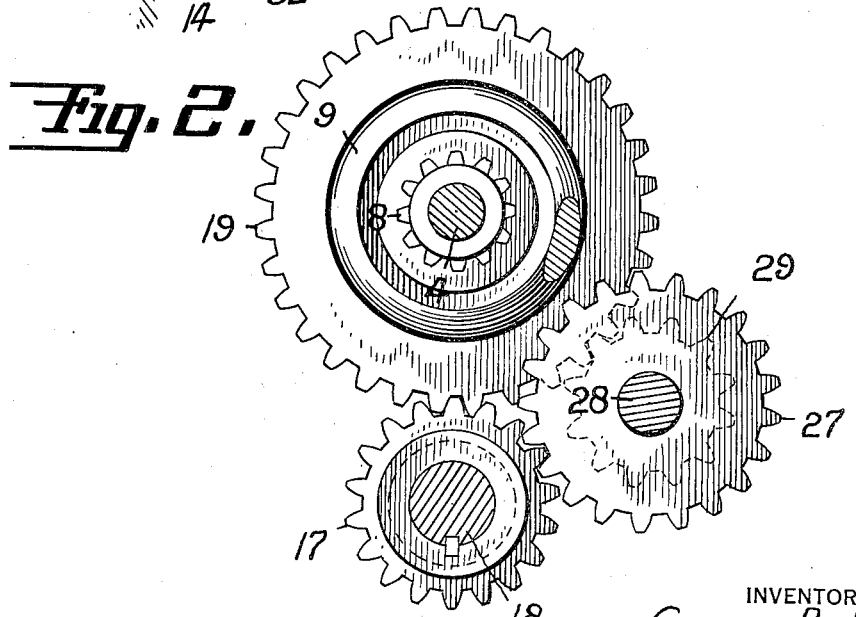
INVENTOR
George B. Moross.
BY
Herbert H. Thompson
his ATTORNEY.

Feb. 8, 1938.  G. B. MOROSS  2,107,422
AUTOMATIC CHANGE SPEED GEARING FOR AUTOMOTIVE VEHICLES
Filed Jan. 26, 1933  3 Sheets-Sheet 2

INVENTOR
George B. Moross.
BY
Herbert H. Thompson
his ATTORNEY.

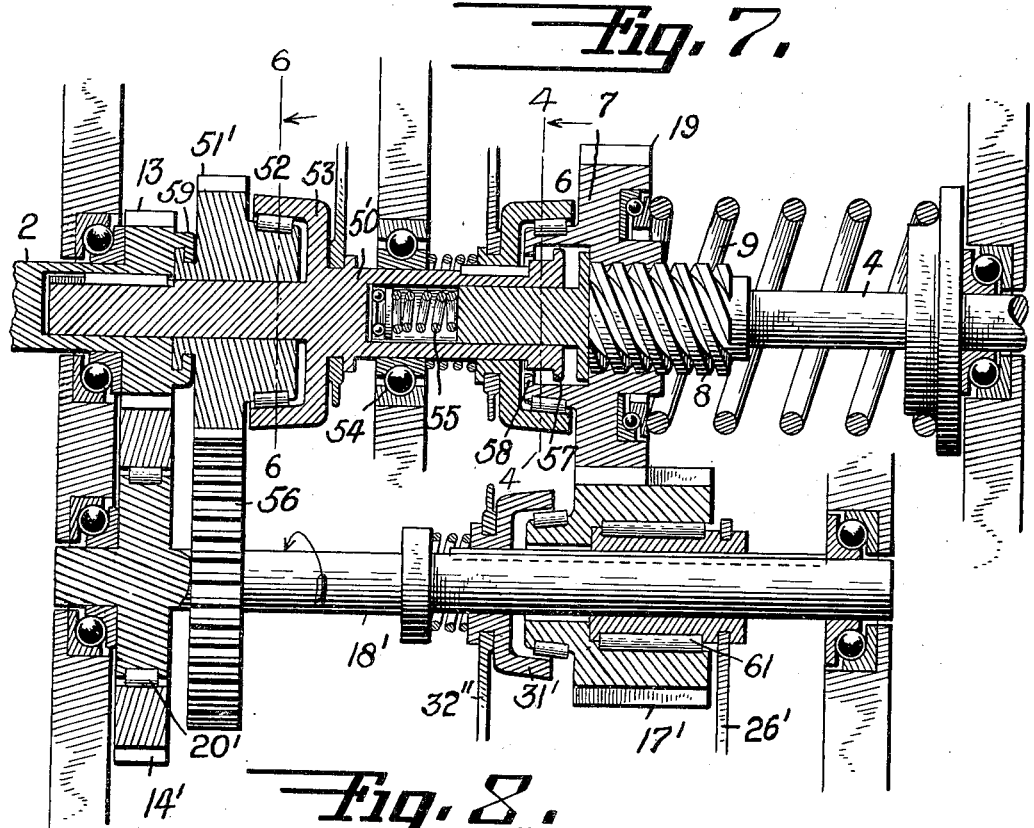
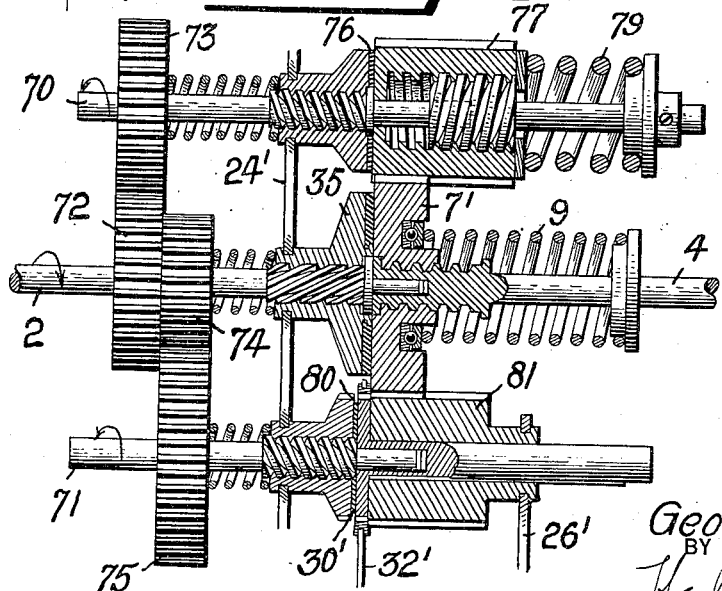

Patented Feb. 8, 1938

2,107,422

UNITED STATES PATENT OFFICE 2,107,422

AUTOMATIC CHANGE SPEED GEARING FOR AUTOMOTIVE VEHICLES

George B. Moross, Woodside, N. Y.

Application January 26, 1933, Serial No. 653,558

3 Claims. (Cl. 74—337)

This invention relates to automatic gear shifts for changing the speed ratio between a driving and a driven shaft in accordance with the torque. By my invention the usual gear shift lever on an automobile and in some cases the usual clutch may be eliminated, my automatic gear-shift causing the low speed gears to supply the driving connection until the torque becomes low enough to shift to a higher speed, whereupon the driving ratio is automatically changed. Obviously the principles of my invention may be applied to any number of gear shifts desired, two, three or more.

Referring to the drawings illustrating several forms of the invention,

Fig. 1 is a section through the gear box of one form of my change speed gearing.

Fig. 2 is a section taken approximately on line 2—2 of Fig. 1 looking in the direction of the arrows.

Fig. 7 is a sectional view similar to Figs. 1 and 2 of my invention as applied to a three-speed transmission.

Fig. 8 is a sectional view of a three-speed transmission, employing the form of friction clutches shown in Fig. 3.

Figure 3:
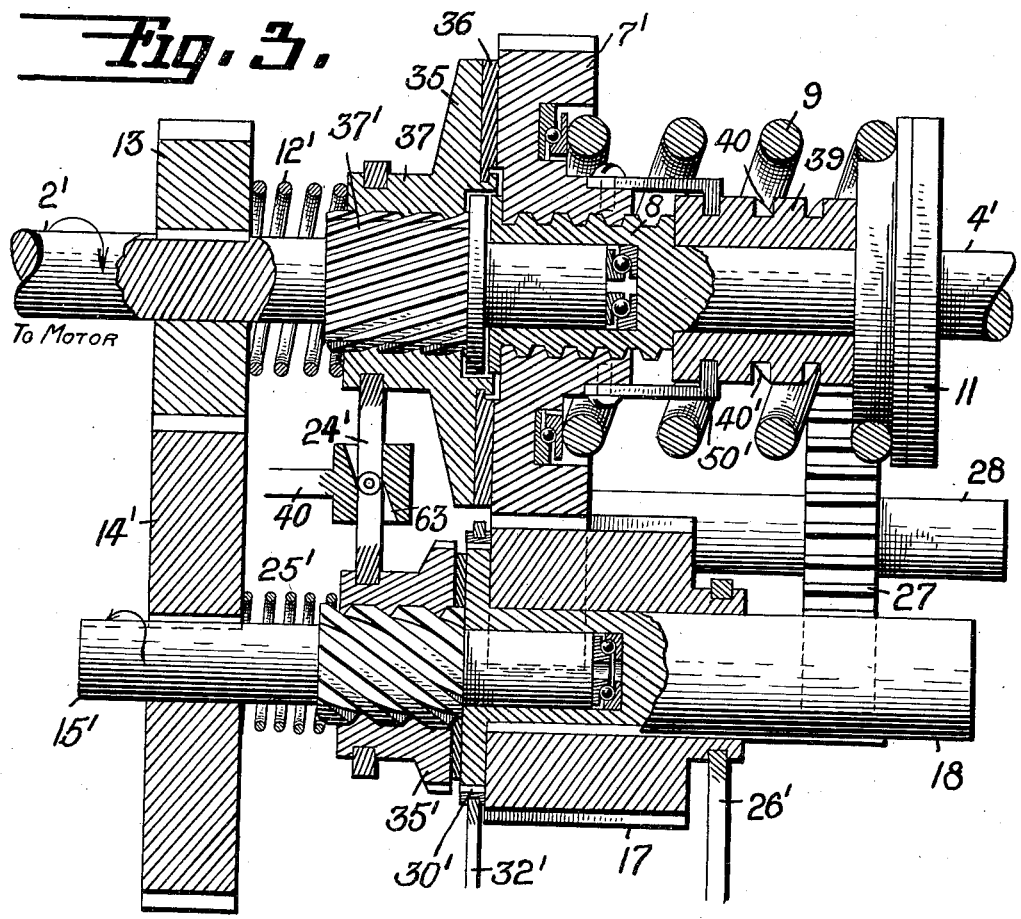
Fig. 3 is a section similar to Fig. 1 of a modified form of my invention.

My change speed gearing may be housed within the usual gear box 1, the driving shaft 2 being journalled at 3 therein and the driven shaft 4 being journalled in the housing at 5 and at its inner end within the hollow end of the driving shaft. A clutch 6 is placed between the two shafts. One member 7 of the clutch is threaded on heavy threads 8 on the driven shaft and is normally forced against collar 8' thereon by a heavy spring 9 which at one end bears against anti-friction bearing 10 within said member and a collar 11 on shaft 4. Said clutch is preferably of the friction grip or non-jaw type, that is, of the type which drives through the frictional contact between discs or the wedging grip between rollers and inclined surfaces. As shown the clutch is shown as a one or two-way roller grip clutch such as frequently used in free wheeling arrangements for automobiles, the rollers 50 being between an annular extension 7' of member 7 and the interior of the other member 51. The clutch surfaces are preferably tapered, and clutch member 51 is yieldingly held in engagement with the other member by being splined on shaft 2 and pressed forwardly by a relatively weak spring 12. A yoke 24 for either hand or foot operation may be provided for manual operation of clutch 6. Said clutch is also opened to reverse the car in connection with yoke 26' hereinafter described and also when using the engine as a brake.

The direct or high speed drive occurs when the clutch 6 is in engagement. A low speed drive may be furnished by pinion 13 on the drive shaft, gear 14 on stub shaft 15 journalled at 16 in the housing, and an elongated pinion 17 splined on shaft 18. Said pinion normally meshes with a large gear 19 which may be formed as a part of clutch member 7. Any suitable form of one-way clutch such as a worm operated friction clutch 20 is placed between shafts 15 and 18, the driving connection being furnished by a stub shaft 21 having a clutch face 62 therein. A spring 25 may be placed between a collar 22 on said shaft and an anti-friction bearing 23 in a fixed bracket 26. Shaft 21 is shown as splined at its outer end within the hollow end of shaft 18 and journalled in said bearing 23. The operation of my automatic gear shift is as follows:

Assuming the engine to have been started and the standard clutch (not shown) to have been thrown in, the initial starting torque on the shaft 4, will be so great that the clutch member 7 will immediately unscrew against the tension of the spring 9 until the clutch 6 is disengaged. The drive will then be through pinion 13, gear 14, clutch 20, pinion 17 and gear 19, said gear having reached a point on the threads 8 where the tension on the spring overcomes the lateral thrust. As soon, however, as the automobile has picked up sufficient speed to lessen the torque on the drive shaft, the spring 9 will force the member 7 to the left to re-engage the clutch 6, whereupon a direct drive will be reestablished. It should be noted that although the low speed gears remain in mesh they will do no driving at this time because clutch 20 is a one-way clutch and the stub shaft 21 at this time is being driven faster than the gear 14 from the pinion 17. The moment, however, that the direct drive is uncoupled or slips sufficiently, the low gear drive is reestablished. It should further be noted that at no time during the change speed transitions is the drive between the driving and driven shafts completely disconnected as is the case in many of the prior art devices so that chattering is avoided.

For reverse speed, a yoke 26' connected to the pinion 17 may be moved to move the latter out of mesh with the gear 19 into mesh with a gear 27 on shaft 28. On said shaft is also mounted a pinion 29 which meshes with the gear 19. Therefore, when the pinion 17 is moved into mesh with the gear 27, a reverse drive is established. In order to use the engine as a brake in going down hill, I may also provide a locking clutch between the shaft 15 and the shaft 21. Said clutch is shown as in the form of a slidable collar 31 moved by the yoke 32 and having teeth thereon engaging aligned slots 30 and 33 in said collar and the hub of said gear respectively. When using the engine in this manner, clutch 6 should also be thrown out by yoke 24.

In the form of the invention shown in Fig. 3 the roller clutches are replaced by friction clutches with a special one-way drive. As shown, one of the clutch faces is provided by the gear 7' while the other is provided by a disc 35 having a clutch disc or discs 36 thereon. Clutch 35 is shown as having a hub 37 threaded on drive shaft 2' and yieldingly held in engagement by the relatively weak spring 12'. The threads 37' are such that they unscrew the clutch member 35 in case the gear 7' tends to rotate faster than shaft 2' so that a one-way clutch effect, i. e. free wheeling is obtained. Gear 7' is again threaded on the coarse threads 8 on the driven shaft 4' and in this case there may be loosely mounted on the driven shaft a lost motion device such as an additional inertia sleeve 39. Said sleeve has on the upper and lower surface thereof curved slots 40 and 40' in which fingers 50' secured to the hub of the gear 7 engage. This sleeve is for the purpose of delaying the axial movements of the gear 7 for a moment in order to effect smoother operation and prevent chattering.

Likewise the clutch member 35' in the low speed gear may also be a friction clutch threaded on the shaft 15' and yieldingly held in engagement by the spring 25', likewise providing a one-way clutch which is uncoupled when the direct drive is effective. Both of said clutches may be manually operated by a double yoke 24' operated from link or lever 140 through a cam slot 63, the arrangement being such that preferably the high speed clutch 35 is disengaged first and engaged after the low speed clutch. To this end, the cam slot 63 has a flat perpendicular face on the right hand side above its pivot and a similar perpendicular face on the left hand side below the pivot, and the spring 12' is preferably made of less tension than the spring 25'. It will therefore be seen that when the lever 140 is pulled to the left, the greatest force will be exerted above the pivot of the lever, thus exerting a greater force to open clutch 35 than clutch 35'. Similarly, when pushing the lever to the right to close the clutches, the reverse is true. It should be noted that with this arrangement the usual clutch may be omitted, since when both clutches 35 and 35' are out, the drive shaft is uncoupled. The reverse drive is also similar, being effected by moving yoke 26'.

Fig. 7 illsutrates one method of applying my invention to a three speed transmission. In this figure the clutch 6 connected to the driven shaft 4 may be of the same form as shown in Fig. 1. One of the low speed drives through gear 14', clutch 20' and shaft 18' may also be similar. However, I interpose between the drive shaft 2 and the driven shaft an additional stub shaft 50' splined to the drive shaft 2 which drives a pinion 13 meshing with the aforesaid gear 14'. Loosely mounted on said shaft is a gear 51' forming one part of a roller clutch 52, the other part 53 being secured to the shaft 50'. The shaft 50' is slidably mounted within the bearing 54 and is yieldingly pressed to the left in Fig. 7 by a spring 55 so as to hold the clutch 52 in engagement. When said clutch is in engagement, the gear 51' will drive the larger gear 56 on shaft 18' and thus drive the pinion 17' through the roller clutch 61 and gear 19 for the second speed drive.

Said shaft 50' has at its end a collar 57 against which a shoulder 58 on clutch member 7 abuts when the member 7 is moved more than a predetermined amount to the right in Fig. 7. When this occurs, obviously the clutch member 7 will pull the shaft 50' to the right with it and thus open the clutch 52 as well as the clutch 6.

The operation of this form of my invention is as follows: The high speed drive is directly from the shaft 2 through shaft 50' to shaft 4, the clutches 6 and 52 both being in engagement. In starting the car, the torque on shaft 4 is so great that the gear 7 will unscrew on the threads 8 first to unclutch the clutch 6 and then to unclutch the clutch 52. At this time the drive will be through pinion 13, gear 14', clutch 20', shaft 18', pinion 17' and gear 19. As the torque on shaft 4 decreases, member 7 will start to move back to the left, first disengaging the shoulder 57 and 58 to permit clutch 52 to be closed by spring 55. At this time the drive will be from pinion 51' to gear 56, shaft 18', pinion 17' and gear 19. The drive through pinion 13 and gear 14' will not be effective at this time on account of the fact that shaft 18' is turning faster than gear 14', thus uncoupling the one-way clutch 20'. As the speed of the car picks up, member 7 will move over to the left to engage clutch 6, thus completing the high speed drive at which time the drive through gears 51' and 56 will also be inoperative on account of the one-way action of the clutch 61 between shaft 18' and pinion 17'. If it is desired to use the engine as a brake, clutch 31' may be thrown in by handle 32" to prevent gear 17' from uncoupling from shaft 18' when the drive is reversed.

Figure 6:
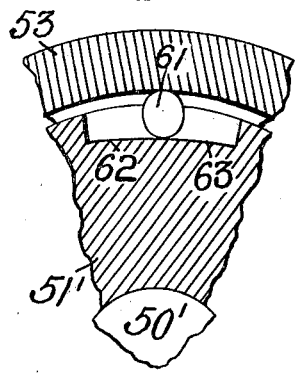
Fig. 6 is a similar view of an alternative form of one-way clutch which may be used in connection with the form of the invention shown in Fig. 7, taken on line 6—6 of Fig. 7.
Figure 4:
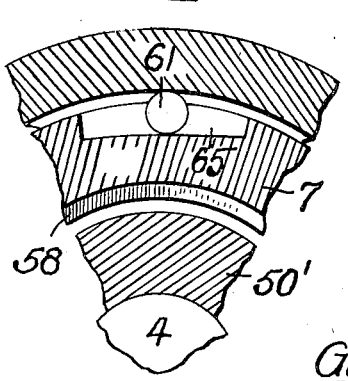
Fig. 4 is a detail view of a portion of the two-way clutch shown in Fig. 7 taken on line 4—4 of Fig. 7.
Figure 5:
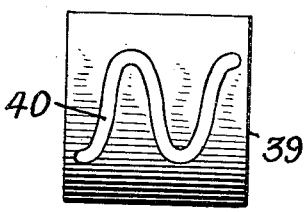
Fig. 5 is a detail of an inertia time lag device used in Fig. 3.

It is obvious that the clutch 52 need not be a one-way clutch and in Fig. 6 I have shown a two-way roller-operated clutch in which the roller 61 is placed in a slot having inclined bottom surfaces 62 and 63 on both sides. Fig. 4 illustrates the ordinary one-way clutch (clutch 6) in which the bottom is inclined on only one side 65.

One method of applying the form of clutches shown in Fig. 3 to a three-speed transmission is illustrated in Fig. 8. In this case the drive shaft 2 is directly geared to both the second speed shaft 70 and the first speed shaft 71 through gears 72 and 73 and 74 and 75. During normal driving clutch 35—7' remains in engagement, giving a direct drive to propeller shaft 4. The parts which correspond to similar parts in Fig. 3 are correspondingly numbered, so that their function will be understood without repeating the description. The driven shaft 70', on which threads 40' are placed, is shown as coupled to the main drive shaft 4 through gears 90 and 91, which also serve to drive the reverse speed shaft 28 through the pinion 27.

In starting however, this clutch will be uncoupled against spring 9, as before, this throwing the drive first through gears 72 and 73, shaft 70 and clutch 76, pinion 77 and gear 7'. But if the load is so great that pinion 77 unscrews against stiff spring 79, clutch 76 will be uncoupled and the drive will be through gears 74 and 75, clutch 80, pinion 81 and gear 7'. It is obvious that the one-way action of the clutches will prevent the lower speed drives from being effective when the higher speeds are driving.

Having described my invention, what I claim and desire to secure by Letters Patent is:

1. In an automatic gear shift, a driving and a driven shaft, a two part friction grip type clutch connecting said shafts for direct drive, reduction gearing around said clutch for slow speed drive, one of the gears of said reduction gearing constituting one part of said clutch, a one-way friction grip type clutch for rendering said slow speed drive inoperative when the direct drive is operating, said gear clutch part being threaded on one of said shafts and biased against movement to open said clutch to constitute torque responsive means for automatically throwing out said first clutch when the torque exceeds a predetermined amount, the drive remaining through said second clutch and manual means for locking out said second clutch and for opening said first clutch for engine braking on hills.

2. In an automatic three speed gear shift for automotive vehicles, a driving and a driven shaft, double reduction gearing for connecting said shafts for first and second speed drives including a third shaft, a two speed gear drive from said drive shaft to said third shaft, a pinion loosely mounted on said third shaft, an overrunning connection between said third shaft and said pinion, a torque responsive clutch for coupling said drive shaft and the higher speed gear thereon, and a second torque responsive clutch for directly coupling said driving and driven shafts, one part of which is threaded on the driven shaft and constitutes a gear meshing with said pinion.

3. In an automatic three speed gear shift for automotive vehicles, a driving shaft, a driven shaft, a friction grip type two-part clutch for connecting said shafts for second speed drive, a second friction grip type two-part clutch for high speed drive, both clutches being opened for low speed drive, one part of each clutch constituting a gear and one part being axially movable to open and close said clutch, a first and a second speed reduction gear cooperating with said other gears, one gear of one of said clutches constituting the axially moving part of said clutch, and torque responsive means for causing axial opening movement of first one and then the other of the movable parts of said clutches to open the same successively for increasing torques, whereby the drive occurs first through the second speed and finally through the low speed drive as the torque increases.

GEORGE B. MOROSS.